(12) United States Patent
Koneru et al.

(10) Patent No.: US 12,481,685 B2
(45) Date of Patent: Nov. 25, 2025

(54) SYSTEMS AND METHODS FOR ENABLING CONVERSATIONAL ACCESS TO TABULAR DATA

(71) Applicant: Kore.ai Inc., Orlando, FL (US)

(72) Inventors: Rajkumar Koneru, Windermere, FL (US); Prasanna Kumar Arikala Gunalan, Hyderabad (IN); Hari Krishna Poludasu, Hyderabad (IN); Sudhamsh Reddy Annam, Nagarkurnool (IN)

(73) Assignee: KORE.AI, INC., Orlando, FL (US)

( * ) Notice: Subject to any disclaimer, the term of this patent is extended or adjusted under 35 U.S.C. 154(b) by 0 days.

(21) Appl. No.: 18/650,377

(22) Filed: Apr. 30, 2024

(65) Prior Publication Data
US 2025/0335475 A1   Oct. 30, 2025

(51) Int. Cl.
G06F 16/00 (2019.01)
G06F 16/3329 (2025.01)
G06F 16/334 (2025.01)

(52) U.S. Cl.
CPC ...... *G06F 16/3329* (2019.01); *G06F 16/3344* (2019.01)

(58) Field of Classification Search
CPC .............. G06F 16/3329; G06F 16/3344
See application file for complete search history.

(56) References Cited

U.S. PATENT DOCUMENTS

| | | | |
|---|---|---|---|
| 12,147,758 B1 * | 11/2024 | Thomas | G06F 40/18 |
| 2005/0039119 A1 * | 2/2005 | Parks | G06F 40/174 |
| | | | 715/209 |
| 2024/0160953 A1 * | 5/2024 | Manda | G06N 5/01 |

OTHER PUBLICATIONS

Guo, Zhixin; Yan, Mingxuan; Qi, Jiexing; Zhou, Jianping; He, Ziwei; Zheng, Guanjie; Wang, Xinbing; Zhou, Chenghu. Adapting Knowledge for Few-shot Table-to-Text Generation. arXiv preprint arXiv:2302.12468 [cs.CL], Mar. 27, 2024. Available at: <https://arxiv.org/pdf/2302.12468>. publisher: arXiv (Cornell University), USA. [Accessed Jul. 16, 2025].

(Continued)

*Primary Examiner* — Syed H Hasan
(74) *Attorney, Agent, or Firm* — TROUTMAN PEPPER LOCKE LLP

(57) ABSTRACT

Methods, non-transitory computer readable media, and a data server that assist with enabling conversational access to tabular data includes determining in response to a user input, tabular data comprising a header row with header data in each column and one or more table data rows with row data in each column. A first prompt is provided to a large language model to generate a dummy table comprising the header row and a dummy row with dummy row data in each column and a dummy table is received. An alias table comprising the header row and an alias row with alias row data in each column is generated. A second prompt is provided to the large language model to generate a dummy row text representation of the dummy row data, wherein the dummy row text representation includes the alias row data inserted as placeholders of the dummy row data and the dummy row text representation is received. A row text representation is generated for each of the one or more table data rows by replacing the alias row data in the dummy row text representation with row data of corresponding ones of the one or more table data rows.

9 Claims, 6 Drawing Sheets

(56) References Cited

OTHER PUBLICATIONS

Chen, Wenhu; Chen, Jianshu; Su, Yu; Chen, Zhiyu; Wang, William Yang, Logical Natural Language Generation from Open-Domain Tables, arXiv (preprint arXiv:2004.10404, v2), Apr. 28, 2020. Available at: <https://arxiv.org/pdf/2004.10404> publisher: arXiv (Cornell University), USA. [Accessed Jul. 16, 2025].

* cited by examiner

Company details

| | C1 | C2 | C3 | C4 | C5 |
|---|---|---|---|---|---|
| R1 | Company name | Region | Country | Revenue | Sector |
| R2 | Acme Corp | APAC | Japan | $100000 | Electronics |
| R3 | Generic Inc | LATAM | Brazil | $200000 | Pharma |
| R4 | Future Airlines | EMEA | Poland | $300000 | Aviation |
| ... | ... | ... | ... | ... | ... |
| R10 | ... | ... | ... | ... | ... |

FIG. 3A

Dummy table

| Company name | Region | Country | Revenue | Sector |
|---|---|---|---|---|
| ABC Industries | EMEA | Germany | $150000 | Manufacturing |

FIG. 3B

Alias table

| Company name | Region | Country | Revenue | Sector |
|---|---|---|---|---|
| ccmpnm32e | creg2532d | ccnt3452e | crev2634d | csec4352f |

FIG. 3C

Data input

```
{
  "dummyrowdata": [
    {
      "Company name": "ABC Industries",
      "Region": "EMEA",
      "Country": "Germany",
      "Revenue": "$150000",
      "Sector": "Manufacturing"
    }
  ],
  "aliasrowdata": [
    {
      "key": "compnm3le",
      "label": "Company name"
    },
    {
      "key": "creg25J2d",
      "label": "Region"
    },
    {
      "key": "ccn04S2e",
      "label": "Country"
    },
    {
      "key": "wev2634f",
      "label": "Revenue"
    },
    {
      "key": "ssec04352f",
      "label": "Sector"
    }
  ]
}
```

FIG. 3D

Company details_Headerdatareplaced

| | C1 | C2 | C3 | C4 | C5 |
|---|---|---|---|---|---|
| R1 | ccmpnm32e | creg2532d | ccnt3452e | crev2634d | csec4352f |
| R2 | Acme Corp | APAC | Japan | $100000 | Electronics |
| R3 | Generic Inc | LATAM | Brazil | $200000 | Pharma |
| R4 | Future Airlines | EMEA | Poland | $300000 | Aviation |
| | ... | ... | ... | ... | ... |
| | ... | ... | ... | ... | ... |
| | ... | ... | ... | ... | ... |
| R10 | ... | ... | ... | ... | ... |

FIG. 3E

SYSTEMS AND METHODS FOR ENABLING CONVERSATIONAL ACCESS TO TABULAR DATA

FIELD

This technology generally relates to accessing tabular data, and more particularly to methods, systems, and computer-readable media for enabling conversational access to tabular data.

BACKGROUND

Conversational artificial intelligence (AI) systems have become a popular customer touchpoint because of the ease of interaction they offer. Customers can converse with enterprise specific custom virtual assistants in natural language and resolve their issues or find the answers to their queries.

In conversational AI systems, tabular data, organized in rows and columns, presents unique challenges in processing, analyzing, and extracting answers due to its structured nature. Tackling large volumes of data to provide natural language answers, such as in the case of tables with thousands of records, is problematic. The sheer volume of data in tables, especially those with thousands of records, makes it impractical to input the entire dataset into a model for generating answers to natural language queries. This approach not only strains computational resources, but also results in a slower and less efficient process. Additionally, generating coherent natural language answers from an array of data poses a significant challenge. As a consequence, alternative methods are sought to overcome these challenges and provide accurate and timely responses.

One example method employed to answer natural language queries on tabular data is to convert them into SQL operations. This involves determining the relevant table data through SQL operations and generating natural language answers based on this data. However, this approach comes with a high level of technical difficulty, and its accuracy may not be sufficient for practical applications. The complexity of mapping natural language queries to SQL operations often leads to inaccuracies, hindering the reliability of this method in real-world scenarios.

Another example approach involves generating hard-coded phrases from the table data, where column names and corresponding row values are concatenated into predefined statements. However, the semantic association of tabular data is not accurately represented and the simplistic nature of this approach fails to capture the nuances and relationships present in the data, resulting in limited accuracy and effectiveness. As the demand for natural language interaction with data continues to grow, overcoming these challenges will be crucial to developing more robust and reliable solutions for processing tabular data in a variety of applications.

SUMMARY

In one example, the present disclosure relates to a method for enabling conversational access to tabular data. The method implemented by a data server comprises determining in response to a user input, tabular data comprising a header row with header data in each column and one or more table data rows with row data in each column. A first prompt is provided to a large language model to generate a dummy table comprising the header row and a dummy row with dummy row data in each column and a dummy table is received. An alias table comprising the header row and an alias row with alias row data in each column is generated. A second prompt is provided to the large language model to generate a dummy row text representation of the dummy row data, wherein the dummy row text representation includes the alias row data inserted as placeholders of the dummy row data and the dummy row text representation is received. A row text representation is generated for each of the one or more table data rows by replacing the alias row data in the dummy row text representation with row data of corresponding ones of the one or more table data rows.

In another example, the present disclosure relates to a data server comprising one or more processors and a memory. The memory coupled to the one or more processors which are configured to execute programmed instructions stored in the memory to determine, in response to a user input, tabular data comprising a header row with header data in each column and one or more table data rows with row data in each column. A first prompt is provided to a large language model to generate a dummy table comprising the header row and a dummy row with dummy row data in each column and a dummy table is received. An alias table comprising the header row and an alias row with alias row data in each column is generated. A second prompt is provided to the large language model to generate a dummy row text representation of the dummy row data, wherein the dummy row text representation includes the alias row data inserted as placeholders of the dummy row data and the dummy row text representation is received. A row text representation is generated for each of the one or more table data rows by replacing the alias row data in the dummy row text representation with row data of corresponding ones of the one or more table data rows.

In another example, the present disclosure relates to a non-transitory computer readable medium storing instructions which when executed by one or more processors, causes the one or more processors to determine, in response to a user input, tabular data comprising a header row with header data in each column and one or more table data rows with row data in each column. A first prompt is provided to a large language model to generate a dummy table comprising the header row and a dummy row with dummy row data in each column and a dummy table is received. An alias table comprising the header row and an alias row with alias row data in each column is generated. A second prompt is provided to the large language model to generate a dummy row text representation of the dummy row data, wherein the dummy row text representation includes the alias row data inserted as placeholders of the dummy row data and the dummy row text representation is received. A row text representation is generated for each of the one or more table data rows by replacing the alias row data in the dummy row text representation with row data of corresponding ones of the one or more table data rows.

BRIEF DESCRIPTION OF THE DRAWINGS

FIG. 3A is an example of the tabular data received by the data server from a user device.

FIG. 3B is an example of a dummy table received by the data server.

FIG. 3C is an example of an alias table generated by the data server.

FIG. 3D illustrates an example data input provided as part of a prompt to a large language model.

FIG. 3E is an example of another table generated by the data server based on the table of FIG. 3A and the alias table of FIG. 3C.

DETAILED DESCRIPTION

Examples of the present disclosure relate to a data server environment and, more particularly, to one or more components, systems, computer-readable media and methods for enabling conversational access to tabular data. The data server environment enables users of applications hosted and/or managed by a data server to, by way of example, provide tabular data or other forms of data such as documents and subsequently conversationally interact with the tabular data. The data server of the data server environment is configured to host and/or manage conversational tools or applications which provide, for example, conversational and search capabilities.

Figure 1:
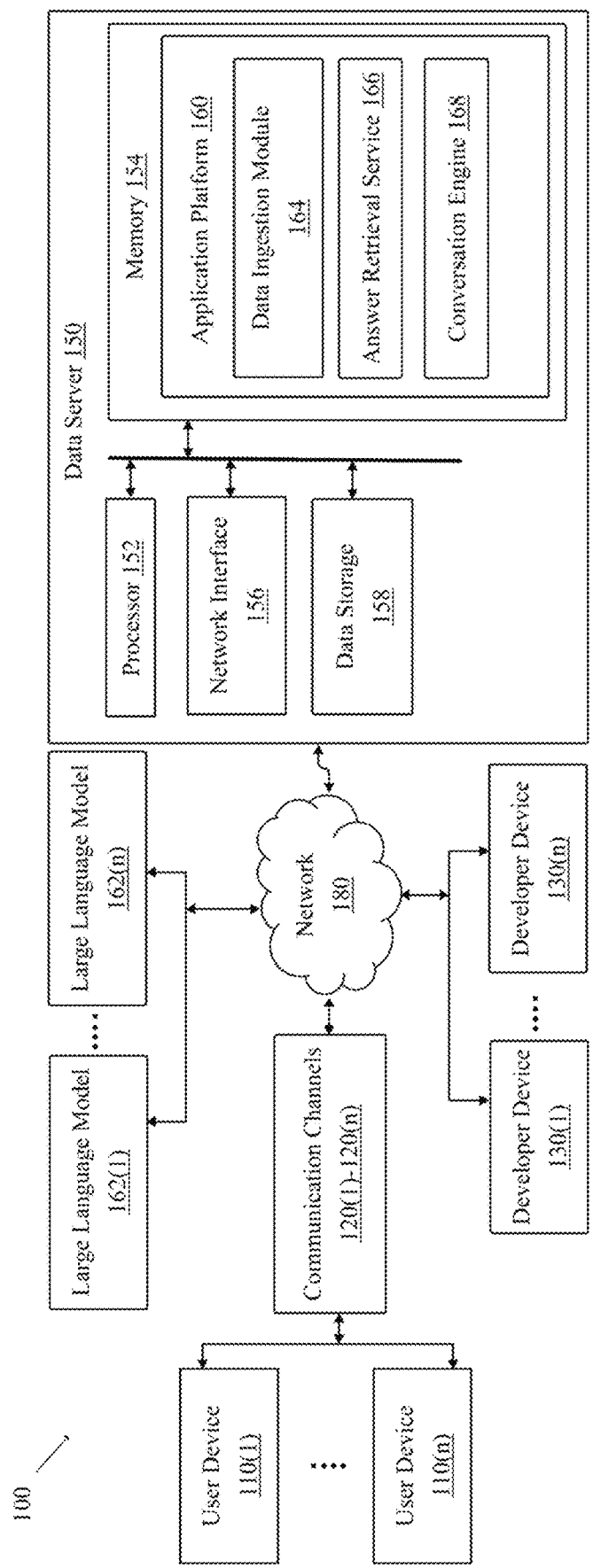
FIG. 1 is a block diagram of an exemplary data server environment for implementing the concepts and technologies disclosed herein.

FIG. 1 is a block diagram of an exemplary data server environment 100 for implementing the concepts and technologies disclosed herein. The environment 100 includes: one or more user devices 110(1)-110($n$), one or more communication channels 120(1)-120($n$), one or more developer devices 130(1)-130($n$), one or more language models 162(1)-162($n$), and a data server 150 coupled together via a network 180, although the environment 100 can include other types and numbers of systems, devices, components, and/or elements and in other topologies and deployments. While not shown, the exemplary environment 100 may additionally comprise: databases, cloud based or on-premise servers, network components, such as routers, switches and other devices, which are well known to those of ordinary skill in the art and thus will not be described here.

The one or more user devices 110(1)-110($n$) may comprise any type of computing device that can facilitate user interaction, for example, a desktop computer, a laptop computer, a tablet computer, a smartphone, a mobile phone, a wearable computing device, or any other type of digital device with communication and data exchange capabilities. The one or more user devices 110(1)-110($n$) may include software and hardware capable of communicating with the data server 150 via the network 180. The one or more users accessing the one or more user devices 110(1)-110($n$) may provide data including documents, web pages, tables, or images to the data server 150 which are ingested by the data server 150.

The one or more users accessing the one or more user devices 110(1)-110($n$) may provide the data server 150 access to one or more systems of record including Content management systems such as, for example, Google Drive or OneDrive, Communication and collaboration systems such as, for example, email communication systems or calendars, Enterprise resource planning systems such as, for example, SAP or Oracle, Customer relationship management system such as, for example, Salesforce or HubSpot, Human resources information systems such as, for example, Workday or ADP Workforce Now, Project management and issue tracking software such as, for example, JIRA, or the like. The data server 150 may ingest data from the one or more systems of record. In one example, ingestion refers to the process of collecting, receiving, and incorporating data provided by the one or more users accessing the one or more user devices 110(1)-110($n$) into the data server 150.

The data server 150 may ingest data from the one or more systems of record. In one example, the users the one or more user devices 110(1)-110($n$) may upload one or more documents comprising tabular data to a virtual assistant hosted and/or managed by the data server 150. In another example, the users the one or more user devices 110(1)-110($n$) may provide access to tabular data stored in their system of record to a virtual assistant hosted and/or managed by the data server 150. Subsequently, the users of the virtual assistant may, for example, provide conversational inputs (e.g., in text or voice) to the virtual assistant about the tabular data. In one example, the conversational inputs are queries about the tabular data.

The one or more users at the one or more user devices 110(1)-110($n$) may provide the conversational inputs such as a text input, a voice input, or a combination of text and voice inputs via the one or more communication channels 120(1)-120($n$). The one or more communication channels 120(1)-120($n$) may include channels such as, enterprise messengers (e.g., Kore.ai WorkAssist Chat, Skype for Business, Microsoft Teams, Slack, Google Hangouts, or the like), social messengers (e.g., Facebook Messenger, WhatsApp Business Messaging, Twitter, Lines, Telegram, or the like), web and mobile channels (e.g., a web application, a mobile application), interactive voice response (IVR) channels, voice channels (e.g., Google Assistant, Amazon Alexa, or the like), live chat channels (e.g., LivePerson, LiveChat, Zendesk Chat, Zoho Desk, or the like), a webhook channel, a short messaging service (SMS), email, a software-as-a-service (SaaS) application, voice over internet protocol (VOIP) calls, computer telephony calls, or the like. To support voice-based communication channels, the environment 100 may include, for example, a public switched telephone network (PSTN), a voice server or a voice gateway, a text-to-speech (TTS) engine, and/or an automatic speech recognition (ASR) engine which are not shown in the FIG. 1.

Also, the one or more user devices 110(1)-110($n$) render and display data received from the data server 150 in a graphical user interface (GUI) (not shown). The one or more user devices 110(1)-110($n$) may execute, for example, web browsers or virtual assistant software, which may render the GUI, although other types and/or numbers of applications may render the GUI in other configurations.

The one or more developer devices 130(1)-130($n$) may communicate with the data server 150 via the network 180. The one or more developers at one or more developer devices 130(1)-130($n$) accessing the data server 150 may configure and train conversational tools and/or applications such as, for example, a virtual assistants which are hosted and/or managed by the data server 150.

The one or more developer devices 130(1)-130($n$) may include any type of computing device that can facilitate developer interaction, for example, a desktop computer, a laptop computer, a tablet computer, a smartphone, a mobile phone, a wearable computing device, or any other type of device with communication and data exchange capabilities. The one or more developer devices 130(1)-130($n$) may include software and hardware capable of communicating with the data server 150 via the network 180. Also, the one or more developer devices 130(1)-130($n$) may render and display the information received from the data server 150, by way of example, to render an interface which the one or more developers at the one or more developer devices 130(1)-130(n) may use to configure one or more conversational tools.

The one or more large language models 162(1)-162(n) (hereinafter referred to as LLMs 162(1)-162(n)) may communicate with the data server 150 via the network 180. In one example, the LLMs 162(1)-162(n) may be hosted by one or more third-party servers (not shown) external to the data server 150. The data server 150 enables integration with the LLMs 162(1)-162(n), for example, in a bring-your-own (BYO) model framework. The LLMs 162(1)-162(n) may comprise, for example, Kore.ai XO GPT, GPT-3, GPT-4, Claude 3, or LLaMA, although there may be other types and/or number of LLMs 162(1)-162(n) in other configurations. Although, only the LLMs 162(1)-162(n) are illustrated, the data server 150 may integrate with other types and/or numbers of models such as small language models or other machine learning models in other configurations.

Each of the LLMs 162(1)-162(n) is a large language model which may perform tasks such as data generation or text generation, although other types of models with configured for other types and/or numbers of tasks or operations may be used. The data server 150 provides the LLMs 162(1)-162(n) with inputs, such as prompts by way of example. Based on the inputs, in one example, the LLM 162(1) generates dummy row data corresponding to header data of a table. In another example, the LLM 162(2) generates a text representation of one or more table data rows of the table. The data generated by the LLMs 162(1)-162(n) may be stored in the data storage 158. In one example, the data ingestion module 164 stores the data generated by the LLMs 162(1)-162(n) in the data storage 158.

The LLMs 162(1)-162(n) may be trained using data provided by the one or more developers at one or more developer devices 130(1)-130(n) or the one or more users at one or more of the user devices 110(1)-110(n). In one example, the LLMs 162(1)-162(n) can determine use cases (e.g. intents) of one or more conversational inputs by leveraging natural language processing (NLP) techniques. The LLM 164(1) can use a variety of techniques such as part-of-speech (POS) tagging, dependency parsing, named entity recognition (NER), and semantic analysis to determine the use case and the context of the conversational inputs. By using these techniques, the LLM 164(1) can determine the underlying use case of the conversational inputs such as "check balance," "transfer funds," "make payment," or the like. The use case of a conversational input is a textual representation of what the customer wants the virtual assistant to do. The one or more entities in the conversational input are, for example, parameters, fields, data, or words required by the virtual assistant to fulfill the use case. For example, in the customer utterance-"Book me a flight to Orlando for next Sunday," the use case is "Book Flight", and the entities are "Orlando" and "Sunday." After the training, the LLMs 162(1)-162(n) may be able to answer such application or domain specific queries.

The data server 150 includes a processor 152, a memory 154, a network interface 156, and a data storage 158, although the data server 150 may include other types and/or numbers of components in other configurations. In addition, the data server 150 may include an operating system (not shown). In one example, the data server 150, one or more components of the data server 150, and/or one or more processes performed by the data server 150 may be implemented using a networking environment (e.g., cloud computing environment). In one example, the capabilities of the data server 150 may be offered as a service using the cloud computing environment.

The components of the data server 150 may be coupled by a graphics bus, a memory bus, an Industry Standard Architecture (ISA) bus, an Extended Industry Standard Architecture (EISA) bus, a Micro Channel Architecture (MCA) bus, a Video Electronics Standards Association (VESA) Local bus, a Peripheral Component Interconnect (PCI) bus, a PCI-Express (PCIe) bus, a serial advanced technology attachment (SATA) bus, a Personal Computer Memory Card Industry Association (PCMCIA) bus, an Small Computer Systems Interface (SCSI) bus, or a combination of two or more of these, although other types and/or numbers of buses may be used in other configurations.

The processor 152 of the data server 150 may execute one or more computer-executable instructions stored in the memory 154 for the methods illustrated and described with reference to the examples herein, although the processor may execute other types and numbers of instructions and perform other types and numbers of operations. The processor 152 may comprise one or more central processing units (CPUs), or general-purpose processors with a plurality of processing cores, such as Intel® processor(s), AMD® processor(s), although other types of processor(s) could be used in other configurations.

The memory 154 of the data server 150 is an example of a non-transitory computer readable storage medium capable of storing information or instructions for the processor 152 to operate on. The instructions, which when executed by the processor 152, perform one or more of the disclosed examples. In one example, the memory 154 may be a random access memory (RAM), a dynamic random access memory (DRAM), a static random access memory (SRAM), a persistent memory (PMEM), a nonvolatile dual in-line memory module (NVDIMM), a hard disk drive (HDD), a read only memory (ROM), an erasable programmable read-only memory (EPROM), an electrically erasable programmable read-only memory (EEPROM), a programmable ROM (PROM), a flash memory, a compact disc (CD), a digital video disc (DVD), a magnetic disk, a universal serial bus (USB) memory card, a memory stick, or a combination of two or more of these. The memory 154 may include other electronic, magnetic, optical, electromagnetic, infrared or semiconductor based non-transitory computer readable storage medium which may be used to tangibly store instructions, which when executed by the processor 152, perform the disclosed examples. The non-transitory computer readable medium is not a transitory signal per se and is any tangible medium that contains and stores the instructions for use by or in connection with an instruction execution system, apparatus, or device. Examples of the programmed instructions and steps stored in the memory 154 are illustrated and described by way of the description and examples herein.

As illustrated in FIG. 1, the memory 154 hosts, manages, and/or provides an application platform 160, although other types and/or numbers of instructions in the form of programs, functions, methods, procedures, definitions, subroutines, or modules may be stored. The data server 150 receives communication from one or more users at the one or more user devices 110(1)-110(n) and provides a response to the communication.

The application platform 160 hosts, manages, and/or provides interfaces to develop, train, and/or deploy conversational applications or search applications. The application platform 160 also hosts, manages, and/or provides conversational tools such as virtual assistants deployed by the enterprises using the application platform 160 and accessed by the one or more users at one or more of the user devices 110(1)-110(n).

The application platform 160 comprises a data ingestion module 164, an answer retrieval service 166, and a conversation engine 168, although the application platform 160 may comprise other types and/or numbers of components in other examples. The one or more developers at one or more developer devices 130(1)-130(n) may use the application platform 160 to create conversational tools or applications such as virtual assistants, conversational search applications, although other types and/or numbers of applications may be created in other configurations. In one example, the applications created using the application platform 160 make information discovery and fulfillment conversational and personalized across websites, ecommerce, or workplaces.

The data ingestion module 164 enables extraction, ingestion, or synchronization of data from one or more data sources. In one example, the one or more developers at one or more developer devices 130(1)-130(n) may upload data to the application platform 160 in the form of documents, spreadsheets, webpages, or portable document format (PDF) documents. The data ingestion module 164 ingests, by way of example, a spreadsheet provided by a user and stores a data of the spreadsheet in the data storage 158. In another example, the one or more developers at the one or more developer devices 130(1)-130(n) may enable data integration and ingestion from external tools to the application platform 160 via application programming interfaces (APIs). In another example, the one or more developers at one or more developer devices 130(1)-130(n) may integrate enterprise applications to the application platform 160 to enable data flow and data ingestion to the application platform 160. The data ingested using the data ingestion module 164 may be stored in the data storage 158. The data ingested using the data ingestion module 164 may be structured data such as from JavaScript object notation (JSON) or Comma-Separated Values (CSV) files or unstructured data such as from documents or PDFs.

The answer retrieval service 166 communicates with the data storage 158 and as a user at one of the user devices 110(1)-110(n) interacts with the conversational search interface, the answer retrieval service 166 finds relevant data or information based on user inputs. The data server 150 may create or manage row text representations of the ingested data or embeddings of the row text representations of the ingested data to provide responses to the user inputs. The row text representations or the embeddings of row text representations may be stored in the data storage 158. The answer retrieval service 166 comprises algorithms and models to perform an analysis based on the user input and the one or more text representations or the vector embeddings of the user input and the one or more text representations and provide one or more responses to the user input based on the analysis, although the one or more responses may be generated and/or provided using other means or methods in other examples. In one example, the one or more row text representations may be presented as responses to the user inputs. In another example, once one or more row text representations corresponding to the user input are identified, the answer retrieval service 166 communicates the one or more row text representations corresponding to the user inputs to one or more of the LLMs 162(1)-162(n) to generate responses to the user inputs, for example, in natural language suitable for the user interface of the user device 110(1). In one example, the answer retrieval service 166 may provide a part of the one or more text representations as a response to the user inputs. The answer retrieval service 166 may also handle the presentation of multiple responses or options to the user inputs.

The conversation engine 168 orchestrates the conversations between the one or more users at the one or more user devices 110(1)-110(n) and the data server 150 using one or more natural language processing engines. The conversation engine 168 orchestrates conversations with the users by performing various actions such as pre-processing the user input, identify a use case of the user input, identify an entity in the user input, generating the response to the user input, although the conversation engine 168 may perform other types and/or numbers of tasks in other examples. The conversation engine 168 may communicate with one or more of the LLMs 162(1)-162(n) to perform one or more of the natural language processing tasks mentioned above. For example, the conversation engine 168 may communicate with the LLM 162(2) to perform use case determination and communicate with the LLM 162(3) to perform response generation. Further, the conversation engine 168 may perform state management of each conversation managed by the data server 150.

The data storage 158 stores database tables, search indexes, row text representations, embeddings of the row text representations. The data storage 158 may comprise relational databases, NoSQL databases, graph databases, vector database, in-memory databases, distributed file systems, vector databases, document stores, or a combination of two or more of these databases. The data storage 158 may include a volatile memory, a non-volatile memory, and/or combinations thereof. The embeddings of the row text representations may be stored in a vector database.

The network interface 156 may include hardware, software, or a combination of hardware and software, enabling the virtual assistant server 150 to communicate with the components illustrated in the environment 100, although the network interface 156 may enable communication with other types and/or number of components in other configurations. In one example, the network interface 156 provides interfaces between the data server 150 and the network 180. The network interface 156 may support wired or wireless communication. In one example, the network interface 156 may include an Ethernet adapter or a wireless network adapter to communicate with the network 180.

The network 180 enables the user devices 110(1)-110(n), the one or more developer devices 130(1)-130(n), or other external systems to communicate with the virtual assistant server 150. The network 180 may be, for example, an ad hoc network, an extranet, an intranet, a wide area network (WAN), a virtual private network (VPN), a local area network (LAN), a wireless LAN (WLAN), a wireless WAN (WWAN), a metropolitan area network (MAN), internet, a portion of the internet, a portion of the public switched telephone network (PSTN), a cellular telephone network, a wireless network, a Wi-Fi network, a worldwide interoperability for microwave access (WiMAX) network, or a combination of two or more such networks, although the network 180 may include other types and/or numbers of networks in other topologies or configurations.

The network 180 may support protocols such as Session Initiation Protocol (SIP), Hypertext Transfer Protocol (HTTP), Hypertext Transfer Protocol Secure (HTTPS), Media Resource Control Protocol (MRCP), Real Time Transport Protocol (RTP), Real-Time Streaming Protocol (RTSP), Real-Time Transport Control Protocol (RTCP), Session Description Protocol (SDP), Web Real-Time Communication (WebRTC), Transmission Control Protocol/Internet Protocol (TCP/IP), User Datagram Protocol (UDP), or Voice over Internet Protocol (VOIP), although other types and/or numbers of protocols may be supported in other topologies or configurations. The network 180 may also support standards and/or formats such as, for example, hypertext markup language (HTML), extensible markup language (XML), voiceXML, call control extensible markup language (CCXML), JSON, although other types and/or numbers of data, media, and document standards and formats may be supported in other topologies or configurations. The network interface 156 of the data server 150 may include any interface that is suitable to connect with any of the above-mentioned network types and communicate using any of the above-mentioned network protocols.

Large tables with numerous rows and columns can overwhelm users, making it difficult to extract relevant information or generate insights. The exemplary methods and systems described herein enable effective understanding and interpretation of tabular data through conversational interaction. For example, a business user reviewing a financial tabular report may want to understand quarterly revenues listed in the financial report. To accomplish this, the business user may upload the financial report to a virtual assistant hosted and/or managed by the data server 150 and the data server 150 ingests the financial report. Subsequently, the business user asks questions about the quarterly revenues in natural language to the virtual assistant and the virtual assistant provides answers to the questions in natural language. The exemplary methods and systems described below illustrate enabling conversational access and interaction with tabular data in further detail.

Figure 2:
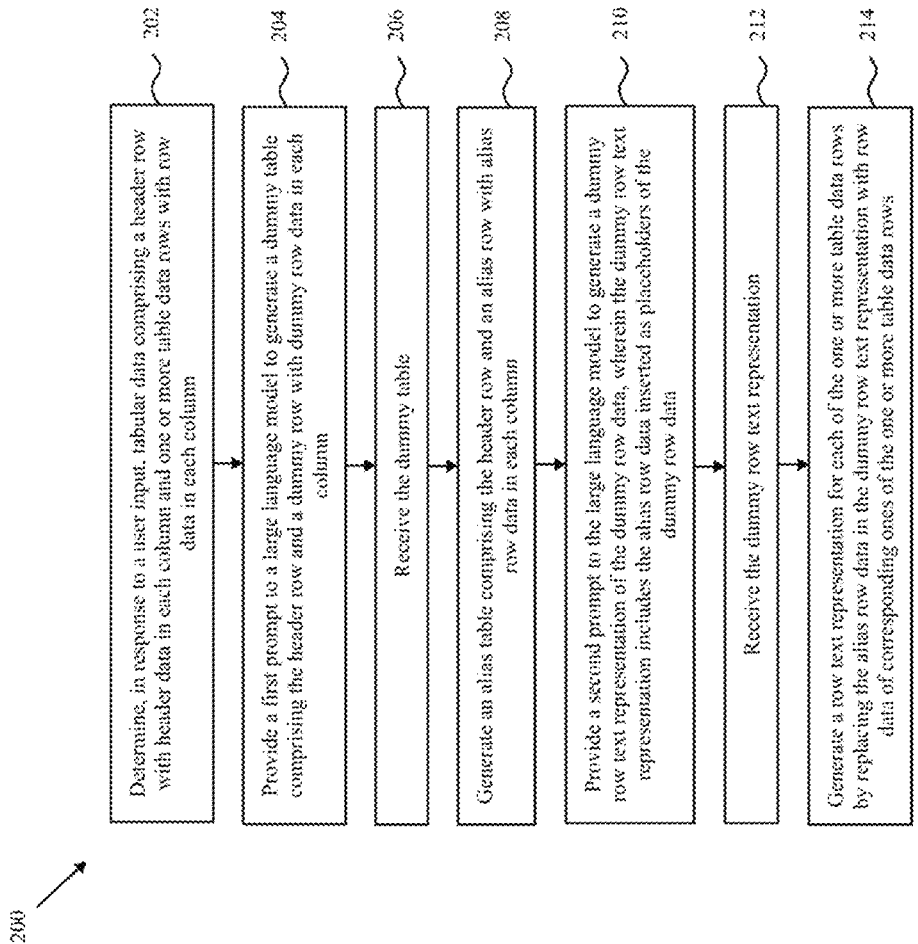
FIG. 2 is a flowchart of an exemplary method for parsing and creating textual representation of tabular data by a data server of FIG. 1.

FIG. 2 is a flowchart of an exemplary method 200 for parsing and creating textual representation of the tabular data by the data server 150. In one example, the user at the user device 110(1) accesses and converses with the virtual assistant hosted and/or managed by the conversation engine 168 of the data server 150. The data server 150 receives a user input with tabular data comprising one or more rows and one or more columns from the user device 110(1). The user at the user device 110(1) may provide the tabular data in the form of a CSV file, an Excel file, a JSON file, or a Google Sheet, although the tabular data may be provided in other types and/or numbers of formats in other configurations. In another example, the user may instead of uploading, select using the virtual assistant, tabular data already uploaded to the data server 150. The data server 150 performs the method steps 202-216 to parse the tabular data and create textual representation of the tabular data. Subsequently, the user at the user device 110(1) provides another user input with a query corresponding to the tabular data. In one example, the user at the user device 110(1) may provide the tabular data and the query corresponding to the tabular data simultaneously as part of a single user input. The data server provides a response to the user input based on the textual representation of the tabular data.

FIG. 3A is an example of tabular data received by the data server 150 from the user device 110(1). The tabular data includes one or more rows (R1-R10) and one or more columns (C1-C5). The tags R1-R10 and C1-C5 are illustrated for representational purposes and are not part of the tabular data received by the data server 150.

Referring back to FIG. 2, at step 202, the data ingestion module 164 of the data server 150 determines, in response to the user input, tabular data comprising a header row with header data in each column and one or more table data rows with row data in each column by parsing the tabular data. The data ingestion module 164 also determines in response to the user input table name or table metadata by parsing the tabular data, although the data server 150 may determine other types and/or numbers of information in other configurations. The parsed information of the tabular data may be stored in the data storage 158. In one example, the user input may also comprise a textual message or voice message and the tabular data.

In the example of FIG. 3A, the data server 150 parses the received tabular data and determines the header row as R1, the one or more table data rows as R2-R10, and the table name of the received tabular data as "company details" from the user input. The data server 150 may determine the header row and the one or more table data rows from the tabular data using machine learning based classifiers, clustering, or pattern recognition methods, although the header row and the one or more table data rows may be determined using other types and/or numbers of methods in other configurations. In one example, the data server 150 may determine the first row of the plurality of rows as the header row and the rest of the plurality of rows as the plurality of data rows. In another example, the data server 150 may use a probabilistic model which uses a probability to determine which of the plurality of rows in the received tabular data is the header row. The data ingestion module 164 may use the textual message or the voice message in the user input to determine the table name or table metadata, although the table name may be determined using other methods. In another example, the data ingestion module 164 may generate a table using the document name and/or a sheet name of the tabular data, for example, as documentname_sheetname.

Referring back to FIG. 2, at step 204, the data server 150 provides a first prompt to the LLM 162(1) to generate a dummy table comprising the header row and a dummy row with dummy row data in each column of the dummy table as illustrated in FIG. 3B. FIG. 3B is an example of the dummy table received by the data server 150 comprising dummy row data for each column of the header row. The dummy table may be stored in the database 158 as a database table, although the data server 150 may store the dummy table using other types and/or numbers of methods in other configurations.

The first prompt provided to the LLM 162(1) comprises the header data. The first prompt also comprises the data types of the header data such as a number, a description, a uniform resource locator, or a phone number. The first prompt also comprises a natural language instruction to generate the dummy row data in each column of the dummy row correlated to the header data and data type of the header data in the corresponding column of the header row. The first prompt may comprise other types and/or numbers of data in other examples.

Based on the first prompt, the LLM 162(1) generates the dummy row data in each column of the dummy row with the same data type or same entity type as the header data in the corresponding column of the header row. For example, if the data type of the header data in a column of the header row is a string, the corresponding dummy row data is also a string. In another example, if the header data in a column of the header row is of the entity type: <city>, the entity type of the corresponding dummy row data is also <city>.

Referring back to FIG. 2, at step 206, the data server 150 receives the dummy table of FIG. 3B from the LLM 162(1). In various examples, the data server 150 may receive the dummy table in one or more structured data formats such as JSON, XML, although dummy table may be received in other formats in other examples.

At step 208, the data server 150 generates an alias table comprising the header row and an alias row with alias row data in each column as illustrated in FIG. 3C. The alias row data in this example comprises alphanumeric data. In another example, the alias row data may comprise encoded data, although the data server 150 may generate other types of alias row data in other examples. In this particular example, the alphanumeric data corresponding to: Company name is "ccmpnm32e," Region is "creg2532d," Country is "cont3452e," Revenue is "crev2634d," and Sector is "csec4352f." The alphanumeric data may be randomly generated by the data server 150. In this example, the header data of the header row and the alias row data corresponding to each column of the header row are stored in an "alias values" database table in the data storage 158, although the data server 150 may store the header data and the alias row data using other manners and/or at other components in other examples. The alias row data may be used for generating a dummy row text representation and is described in greater detail below.

At step 210, the data server 150 provides a second prompt to the LLM 162(1) to generate a dummy row text representation of the dummy row data, wherein the dummy row text representation includes the alias row data inserted as placeholders of the dummy row data. The second prompt comprises a data input comprising the header data associated with the dummy row data, and the header row data associated with the alias row data. FIG. 3D illustrates an example data input provided as part of the second prompt to the LLM 162(1). The data server 150 converts the data in the dummy table and alias table into the JSON format of the data input, although the data input may comprise other types and/or numbers of formats in other examples. In this example data input, the JSON object—dummyrowdata, illustrates the header data associated with the dummy row data, and the JSON object—aliasrowdata, illustrates the header data associated with the alias row data.

The second prompt also comprises a natural language instruction to generate the dummy row text representation, although the second prompt may comprise other types and/or numbers of data or instructions in other examples. The natural language instruction of the second prompt instructs the LLM 162(1) to generate the dummy row text representation based on the JSON object "dummyrowdata" and by inserting the alias row data from "aliasrowdata" JSON object as placeholders of the dummy row data.

The dummy row text representation is a textual representation of the dummy row data. "The company, identified by the name {{ccmpnm32c}}, has a significant presence in the {{creg2532d}} region. Specifically, it is based in the country of {{ccnt3452e}}. The company operates in the {{csec4352f}} sector and has been successful in generating a revenue of {{crev2634d}}. This information provides a snapshot of the company's current status and its financial performance in its operating sector and region," is an example dummy row text representation of the dummy row data. At step 212, the data server receives the dummy row text representation from the LLM 162(1).

At step 214, the data server 150 generates a row text representation for each of the one or more table data rows by replacing the alias row data in the dummy row text representation with row data of corresponding ones of the one or more table data rows.

To perform this, the data server 150 determines a correlation between alias row data of the alias table and the row data of the one or more table data rows by generating a "Company details_Headerdatareplaced" table as illustrated in FIG. 3E. FIG. 3E illustrates the example "Company details_Headerdatareplaced" table generated by the data server 150 based on the exemplary table of FIG. 3A and the alias table of FIG. 3C, by replacing the header data in each column of the header row of the "Company details" table with the corresponding alias row data determined from the alias table. For example, the header data "Company name" in the "Company details" table of FIG. 3A is replaced with the alias row data "ccmpnm32e." Similarly, "Region" is replaced with "creg2532d," "Country" is replaced with "ccnt3452e," "Revenue" is replaced with "crev2634d," and "Sector" is replaced with "csec4352f."

The "Company details_Headerdatareplaced" table may be stored as a database table in the data storage 158. In one example, the "Company details_Headerdatareplaced" table is not generated and the data server 150 replaces the header data with the alias row data in the "Company details." Using the "Company details_Headerdatareplaced" table, the data server 150 determines the correlation between the alias row data and the row data of each of the one or more table data rows. For example, for the row R2, the data server 150 determines the correlation as, ccmpnm32e: Acme Corp, creg2532d: APAC, cont3452e: Japan, crev2634d: $100000, and csec4352f: Electronics.

Based on the determined correlation, to generate the row text representation of each of the one or more table data rows, the data server 150 replaces the alias row data in the dummy row text representation with row data of corresponding ones of the one or more table data rows. "The company, identified by the name Acme Corp, has a significant presence in the APAC region. Specifically, it is based in the country of Japan. The company operates in the Electronics sector and has been successful in generating a revenue of $100000. This information provides a snapshot of the company's current status and its financial performance in its operating sector and region," is an example row text representation of the table data row R2 of the "Company details" table of FIG. 3A. In this example, the row text representation of the row data of the row R2 is generated by replacing the alias data-"ccmpnm32e" with Acme Corp, "creg2532d" with APAC, "ccnt3452e" with Japan, "crev2634d" with $100000, and "csec4352f" with Electronics. Similarly, the row text representations of the table data rows R3-R10 of the "Company details" table are generated. It may be understood that, using this method the row data of the "Company details" table is not shared with the LLM 162(1) at any point of time. Further, the generated row text representations are textual descriptions of each row of the tabular data. The generated row text representations also capture the semantic association of the tabular data.

The generated row text representations are stored within the data storage 158 and the row text representations are used to provide responses to the user inputs provided by the user, for example, from the user device 110(1). The answer retrieval service 166 of the data server 150 may use sparse similarity, dense similarity search techniques, or a combination of these to provide responses to the user inputs, although other types and/or numbers of search techniques may be used in other examples.

The data server 150 generates a vector embedding for the each of the generated row text representations and may store the generated vector embeddings of the one or more table data rows R2-R10 in a vector database of the data storage 158. When the data server 150 receives the user input, for example, "which region does Acme corp operate in," the data server 150 also generates a vector embedding for the user input. Subsequently, the data server 150 calculates a cosine similarity between the vector embedding of the user input and the vector embeddings of each of the generated row text representations of the one or more table data rows R2-R10. The row text representation with the highest cosine similarity score, for example—the row text representation of the table data row R2, may be provided as the response to the user input.

The data server 150 may only provide a part of the row text representation with the highest cosine similarity score as the response to the user input. The data server 150 may calculate a semantic similarity between the user input and one or more parts of the generated row text representation to determine a text snippet of the row text representation as the response to the user input, although other types and/or numbers of techniques may be used to determine the text snippet in other configurations.

Providing the tabular data to LLMs 162(1)-162(n) to generate text representation of the tabular data may create data privacy and security issues. The usage of dummy row data and alias row data enables the data server 150 to generate the text representation of the tabular data without sharing the tabular data with the LLMs 162(1)-162(n). The dummy row data that is a part of the data input enables the LLM 162(1) to understand the tabular data better. Further, the alias row data enables the data server 150 to maintain data integrity. Consider an example where the alias values are not used and the second prompt instructs the LLM 162(1) to use the header data as placeholders of the dummy row data in the generation of dummy row text representation. The LLM 162(1) may modify the header data in the dummy row text representation. For example, if the header data is "Company_name", the LLM 162(1) may change the header data to "Company name" removing the underscore. The resultant dummy row text representation generated by the LLM 162(1) would be "The name of the company is {{Company name}} . . . " As the header data is used to generate the row text representation and the alias row data is not used, in subsequently generating the row text representation of the tabular data, the data server 150 tries to find {{Company_name}} to replace with row data. However, this results in a data mismatch as the LLM 162(1) modified {{Company_name}} to {{Company name}}. The usage of alias values as placeholders of the dummy row data ensures that the LLM 162(1) generates the dummy row text representation without any inaccuracies and there are no data mismatch issues in the subsequent generation of row text representation.

Having thus described the basic concept of the invention, it will be rather apparent to those skilled in the art that the foregoing detailed disclosure is intended to be presented by way of example only, and is not limiting. Various alterations, improvements, and modifications will occur and are intended for those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method comprising:
   determining, by a data server, in response to a user input, tabular data comprising a header row with header data in each column and one or more table data rows with row data in each column;
   providing, by the data server, a first prompt to a large language model to generate a dummy table comprising the header row and a dummy row with dummy row data in each column;
   receiving, by the data server, the dummy table;
   generating, by the data server, an alias table comprising the header row and an alias row with alias row data in each column;
   providing, by the data server, a second prompt comprising header data associated with the dummy row data and the header data associated with the alias row data, to the large language model to generate a dummy row text representation of the dummy row data, wherein the dummy row text representation includes the alias row data inserted as placeholders of the dummy row data;
   receiving, by the data server, the dummy row text representation;
   determining, by the data server, a correlation between the row data of the one or more table data rows and the alias row data by replacing in the tabular data, the header data of each column with the corresponding alias row data determined from the alias table;
   generating, by the data server, a row text representation for each of the one or more table data rows by replacing the alias row data in the dummy row text representation with row data of corresponding ones of the one or more table data rows based on the correlation;
   receiving, by the data server, a user query from the user device;
   semantically comparing, by the data server, the user query to one or more of the generated row text representations to determine an answer to the user query; and
   providing, by the data server, to the user device, the determined answer as a response to the user query.

2. The method of claim 1, wherein the tabular data is stored as a database table.

3. The method of claim 1, wherein each row text representation is a semantic summary of one of the one or more table data rows.

4. A data server comprising:
   one or more processors; and
   a memory coupled to the one or more processors which are configured to execute programmed instructions stored in the memory to:
   determine, in response to a user input, tabular data comprising a header row with header data in each column and one or more table data rows with row data in each column;
   provide a first prompt to a large language model to generate a dummy table comprising the header row and a dummy row with dummy row data in each column;
   receive the dummy table;
   generate an alias table comprising the header row and an alias row with alias row data in each column;
   provide a second prompt comprising header data associated with the dummy row data and the header data associated with the alias row data, to the large language model to generate a dummy row text representation of the dummy row data, wherein the dummy row text representation includes the alias row data inserted as placeholders of the dummy row data;

receive the dummy row text representation;

determine a correlation between the row data of the one or more table data rows and the alias row data by replacing in the tabular data, the header data of each column with the corresponding alias row data determined from the alias table;

generate a row text representation for each of the one or more table data rows by replacing the alias row data in the dummy row text representation with row data of corresponding ones of the one or more table data rows based on the correlation;

receive a user query from the user device;

semantically compare the user query to one or more of the generated row text representations to determine an answer to the user query; and provide to the user device the determined answer as a response to the user query.

5. The data server of claim 4, wherein the tabular data is stored as a database table.

6. The data server of claim 4, wherein each row text representation is a semantic summary of one of the one or more table data rows.

7. A non-transitory computer readable medium storing instructions which when executed by one or more processors, causes the one or more processors to:

determine, in response to a user input, tabular data comprising a header row with header data in each column and one or more table data rows with row data in each column;

provide a first prompt to a large language model to generate a dummy table comprising the header row and a dummy row with dummy row data in each column;

receive the dummy table;

generate an alias table comprising the header row and an alias row with alias row data in each column;

provide a second prompt comprising header data associated with the dummy row data and the header data associated with the alias row data, to the large language model to generate a dummy row text representation of the dummy row data, wherein the dummy row text representation includes the alias row data inserted as placeholders of the dummy row data;

receive the dummy row text representation;

determine a correlation between the row data of the one or more table data rows and the alias row data by replacing in the tabular data, the header data of each column with the corresponding alias row data determined from the alias table;

generate a row text representation for each of the one or more table data rows by replacing the alias row data in the dummy row text representation with row data of corresponding ones of the one or more table data rows based on the correlation;

receive a user query from the user device;

semantically compare the user query to one or more of the generated row text representations to determine an answer to the user query; and provide to the user device the determined answer as a response to the user query.

8. The non-transitory computer readable medium of claim 7, wherein the tabular data is stored as a database table.

9. The non-transitory computer readable medium of claim 7, wherein each row text representation is a semantic summary of one of the one or more table data rows.

* * * * *